Patented July 3, 1928.

1,675,478

UNITED STATES PATENT OFFICE.

FRITZ BALLAUF, FRIEDRICH MUTH, AND ALBERT SCHMELZER, OF ELBERFELD, GERMANY, ASSIGNORS TO GRASSELLI DYESTUFF CORPORATION, OF NEW YORK, N. Y.

DYESTUFF INTERMEDIATES.

No Drawing. Application filed January 16, 1925, Serial No. 2,926, and in Germany January 24, 1924.

We have invented new and useful improvements in the manufacture of dyestuff intermediates of which the following is a specification.

Our present invention consists in the production of the new carbazoloic-acid-arylid-indophenols which we have found to be valuable intermediates for the production of sulphide vat dyestuffs. Whereas the carbazoloic acids themselves, i. e.,

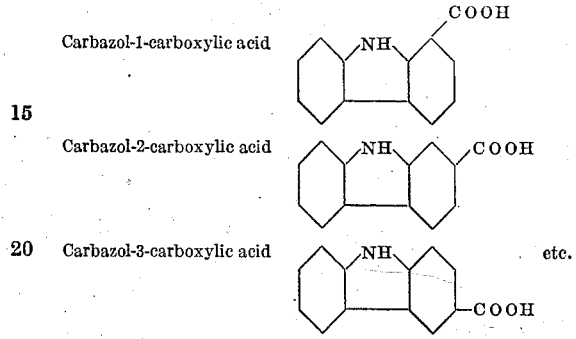

Carbazol-1-carboxylic acid

Carbazol-2-carboxylic acid

Carbazol-3-carboxylic acid   etc.

do not condense readily with nitroso-phenols to the corresponding indophenols, we have found that by reacting primary and secondary amines in the presence of condensing agents with carbazoloic acids, carbazoloic acid-arylids of the following type are obtained:

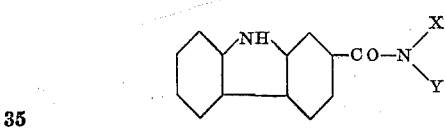

(in which formula X stands for hydrogen or a hydrocarbon radical and Y for a hydrocarbon radical) and these condense easily with nitrosophenols. The different carbazol-carboxylic acids can be used, though the carbazol-1- and the carbazol-2-carboxylic acids being the most easily technically accessible are particularly valuable for our process. The carbazol-1-carboxylic acid can be produced according to Ciamician (Gaz. 12, page 272) and the carbazol-2-carboxylic acid is described by Borsche (Ber. 40 page 381). Aliphatic as well as aromatic primary and secondary amines can be condensed with the acids. In the examples given herein we describe the condensation of carbazol-carboxylic acids with amines such as dimethyl-amine, para-toluidine, 2-amido-carbazol, but our invention is not limited to the use of these amino bodies.

*Example 1.*—42 parts by weight of carbazol-2-carboxylic acid are dissolved in 1000 parts of toluol and at the boiling temperature of toluol, dimethyl-amine is bubbled through this solution with a simultaneous and gradual addition of phosphorous trichloride, until no more free carbazoloic acid can be detected in the solution. The solvent is now distilled off, the residue digested with water and the water insoluble carbazoloic acid-arylid filtered off. The 2-carbazoloic-acid-dimethyl-amid is obtained by recrystallization from nitrobenzol in thick needles melting with slight decomposition at 198° C; by prolonged heating the melt becomes clear and transparent. The 2-carbazoloic-acid-dimethyl-amid is insoluble in most organic solvents as well as in water, caustic alkali solutions and dilute acids, but easily soluble in more concentrated sulfuric acids (from 60–66°) and in hot nitrobenzol; in cold nitrobenzol it is only sparingly soluble.

The amid as obtained in the above is dried and dissolved in 2750 parts by weight of concentrated sulfuric acid 66°. 27.5 parts by weight of nitrosophenol are dissolved in 460 parts of concentrated sulfuric acid of about 64° Bè, both solutions are cooled and mixed. After a short while the reaction mass is poured on ice, the reddish-blue colored indophenol is filtered off. It probably has the formula:

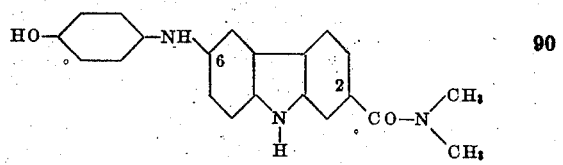

The indophenol dissolves in alcohol with a reddish blue color and in concentrated sulfuric acid with a greenish blue color. In alkaline solution the indophenol is readily reduced by sodium-sulfide or hydrosulfide (NaSH) to the corresponding leuco-indophenol. The latter can also be obtained directly by pouring the reaction mass in sulfuric acid upon a solution of caustic soda diluted with a large amount of ice, reducing this solution and precipitating the leuco-indophenol by acidification.

*Example 2.*—Carbazol-3-carboxylic acid is treated in toluol solution with para-toluidin and phosphorous-tri-chloride as condensation agent. The 3-carbazoloic-para-toluid is insoluble in water, alkali solutions and dilute acids, quite difficulty soluble in most organic solvents but soluble in concentrated sulfuric acid. The arylid so obtained is dissolved in concentrated sulfuric acid, the solution cooled and a molecular proportion of nitrosophenol added. The indophenol forms readily and quickly. The sulfuric acid solution is diluted with a large amount of ice and the precipitated indophenol filtered off. When dried it forms a blue powder, soluble in concentrated sulfuric acid with a greenish blue color, and when reduced in alkaline solution with sodium sulfide or hydrosulfide, forms the corresponding leuco compound.

*Example 3.*—Carbazol-1-carboxylic acid is condensed in boiling toluol solution with molecular proportions of 2-amido-carbazol, using phosphorous-tri-chloride as a condensing agent. After distilling off the solvent the arylid is digested with water and filtered off. The 1-carbazoloic-acid-2-carbazolamid is insoluble in most organic solvents as well as in water, caustic alkali and dilute acids; it is readily soluble in concentrated sulfuric acids (from 60–66° Bé.). The arylid so obtained is dissolved in concentrated sulfuric acid and condensed with molecular proportions of nitrosophenol. The formation of the indophenol proceeds quickly and the solution is poured on ice, the indophenol precipitating. Filtered off and dried, it is a blue powder soluble in concentrated sulfuric acid with a greenish blue color; by reduction with sodium sulfide or sodium hydrosulfide in alkaline solution it yields the corresponding leuco-compound.

*Example 4.*—42 parts by weight of carbazol-2-carboxylic acid are suspended in 900 parts toluol and 22 parts para-toluidin added. The reaction mass is heated to 70° C., 10.5 parts phosphorous tri-chloride added and boiled for several hours. The solvent is steamed off, the residue digested with water and the insoluble arylid filtered off. The 2-carbazoloic-para-toluid forms shiny elongated leaflets, melting at 294° C. It is insoluble in most organic solvents as well as in water, caustic alkali solutions, dilute acid, sparingly soluble in hot and cold alcohol (20 grams to the liter) easily soluble in hot, but insoluble in cold nitrobenzol, and very soluble in sulfuric acid of concentrations of above 60° Bé. The dry toluid as obtained in the above is dissolved in 3200 parts sulfuric acid containing 90% $H_2SO_4$, cooled to about 0° C. and 27.5 parts para-nitroso-phenol dissolved in 450 parts 90% sulfuric acid are added. As soon as all of the nitroso-phenol has reacted, the reaction mass is poured upon ice, filtered and the filter cake washed with water. The dried 2-carbazoloic-acid-para-toluid indophenol is a blue powder, soluble in concentrated sulfuric acid with a blue color; in alkaline solution it is readily reduced by sodium sulfide or hydrosulfide to the leuco compound.

We claim:—

1. In processes of making carbazoloic-acid-arylid-indophenols the steps comprising reacting aromatic amino bodies in the presence of a condensation agent with carbazol-carboxylic acids and condensing the so obtained carbazoloic-acid-arylids with nitrosophenols.

2. In processes of making carbazoloic-acid-arylid-indophenols the steps comprising reacting aromatic amino bodies in the presence of phosphorous tri-chloride with carbazol-carboxylic acids and condensing the so obtained carbazoloic-acid-arylids with nitroso-phenols in sulfuric acid solution.

3. In processes of making indophenols of carbazoloic-acid-amide compounds the steps comprising reacting organic amines having a replaceable hydrogen atom linked to the nitrogen, in the presence of a condensation agent, with carbazol-carboxylic acids and condensing the so-obtained carbazoloic-acid-amide compounds with nitrosophenols.

4. In processes of making indophenols of carbazoloic-acid-amide compounds the steps comprising reacting organic amines having a replaceable hydrogen atom linked to the nitrogen, in the presence of phosphorous tri-chloride, with carbazol-carboxylic acids and condensing the so-obtained carbazoloic-acid-amide compounds with nitrosophenols in presence of sulfuric acid.

5. As new products the carbazoloic-acid-arylid-indophenols which are substantially identical with products obtainable by reacting aromatic amino bodies with carbazol-carboxylic acids and condensing the carbazoloic-acid-arylids so obtained with nitrosophenols which carbazoloic-acid-arylid-indophenols are reddish-blue to blue powders, soluble in concentrated sulfuric acid with from reddish-blue to blue color and being reduced in alkaline solution with sodium sulfide or hydrosulfide to the corresponding leuco compounds.

6. As new products the indophenols of carbazoloic-acid-amide compounds which are substantially identical with products obtainable by reacting organic amines, having a replaceable hydrogen atom linked to the nitrogent, with carbazol-carboxylic acids and condensing the carbazoloic-acid-amide compounds so obtained with nitrosophenols, which indophenols are reddish-blue to blue powders, soluble in concentrated sulfuric acid with from reddish-blue to blue color and which in alkaline solution are readily reduced with sodium sulfide or hydrosulfide to the corresponding leuco compounds.

In testimony whereof we have hereunto set our hands.

FRITZ BALLAUF.
FRIEDRICH MUTH.
ALBERT SCHMELZER.